United States Patent
DePietro

(10) Patent No.: US 9,752,297 B2
(45) Date of Patent: Sep. 5, 2017

(54) COVER ALIGNMENT TOOL

(71) Applicant: Universal Hinge Corporation, Manchester, NH (US)

(72) Inventor: Edward A. DePietro, Manchester, NH (US)

(73) Assignee: Universal Hinge Corporation, Manchester, NH (US)

( * ) Notice: Subject to any disclaimer, the term of this patent is extended or adjusted under 35 U.S.C. 154(b) by 0 days.

(21) Appl. No.: 14/770,478

(22) PCT Filed: Mar. 21, 2014

(86) PCT No.: PCT/US2014/031389
§ 371 (c)(1),
(2) Date: Aug. 26, 2015

(87) PCT Pub. No.: WO2014/153486
PCT Pub. Date: Sep. 25, 2014

(65) Prior Publication Data
US 2016/0017568 A1  Jan. 21, 2016

Related U.S. Application Data

(60) Provisional application No. 61/804,324, filed on Mar. 22, 2013.

(51) Int. Cl.
*E02D 29/14* (2006.01)
*E02D 29/12* (2006.01)
(Continued)

(52) U.S. Cl.
CPC .......... *E02D 29/1445* (2013.01); *B25B 27/16* (2013.01); *E02D 29/12* (2013.01);
(Continued)

(58) Field of Classification Search
CPC ................ B66C 23/208; B66C 23/203; Y10T 29/49895; Y10T 29/53657;
(Continued)

(56) References Cited

U.S. PATENT DOCUMENTS

| | | | | |
|---|---|---|---|---|
| 2,393,795 A | * | 1/1946 | Miller | B25B 27/16 254/100 |
| 7,556,160 B2 | * | 7/2009 | Porebski | B66C 23/203 212/179 |

(Continued)

OTHER PUBLICATIONS

PCT International Search Report for PCT/US2014/031389, dated Jul. 30, 2014, Korean Intellectual Property Office.

*Primary Examiner* — David Bryant
*Assistant Examiner* — Lee A Holly
(74) *Attorney, Agent, or Firm* — Robert R. Deleault, Esq.; Mesmer & Deleault, PLLC

(57) ABSTRACT

An alignment tool device for use in aligning a manway cover to a manway body/flange during installation of the manway cover includes a body/flange plate having a flange plate body with a plurality of flange plate openings and an alignment support structure, a cover plate having a cover plate body with a plurality of cover plate openings, and a height adjuster extending through the alignment support structure where the height adjuster is adapted to change a position of the cover plate relative to the flange plate to substantially align the manway cover openings with corresponding manway flange openings.

14 Claims, 14 Drawing Sheets

(51) Int. Cl.
*B25B 27/16* (2006.01)
*F16L 55/10* (2006.01)

(52) U.S. Cl.
CPC ......... *F16L 55/10* (2013.01); *Y10T 29/49899* (2015.01); *Y10T 29/53913* (2015.01)

(58) Field of Classification Search
CPC ......... Y10T 29/53913; Y10T 29/53678; Y10T 29/4984; Y10T 29/49819; B65D 90/10; B25B 27/16; B66D 3/16; E02D 29/1445; E02D 29/12; F16L 55/10
See application file for complete search history.

(56) References Cited

U.S. PATENT DOCUMENTS

| | | | |
|---|---|---|---|
| 7,703,215 B1* | 4/2010 | Sanchez | B25B 27/16 33/520 |
| 8,038,031 B2* | 10/2011 | DePietro | B65D 90/10 16/382 |
| 2006/0219649 A1* | 10/2006 | Wolfford | B66D 3/16 212/166 |

* cited by examiner

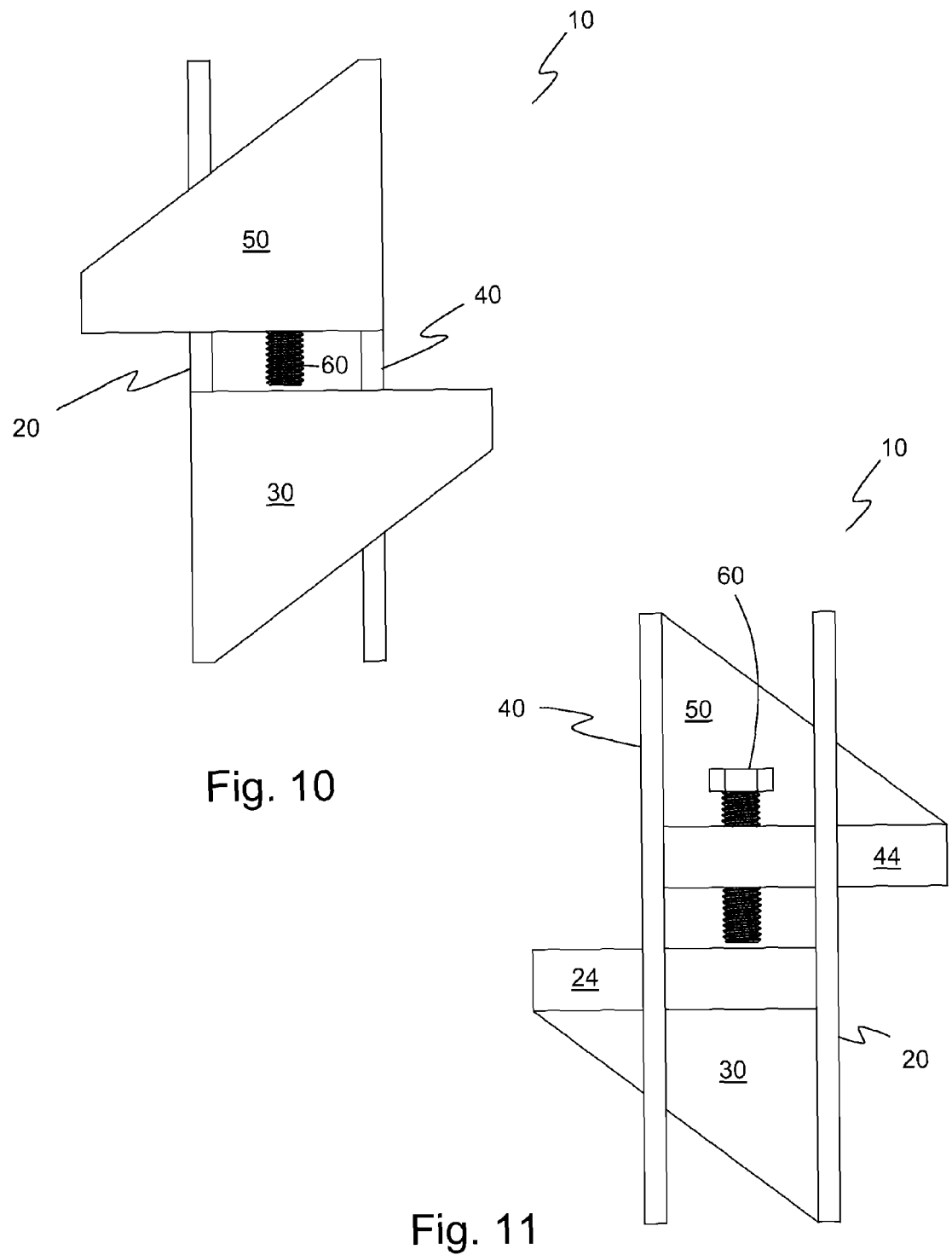

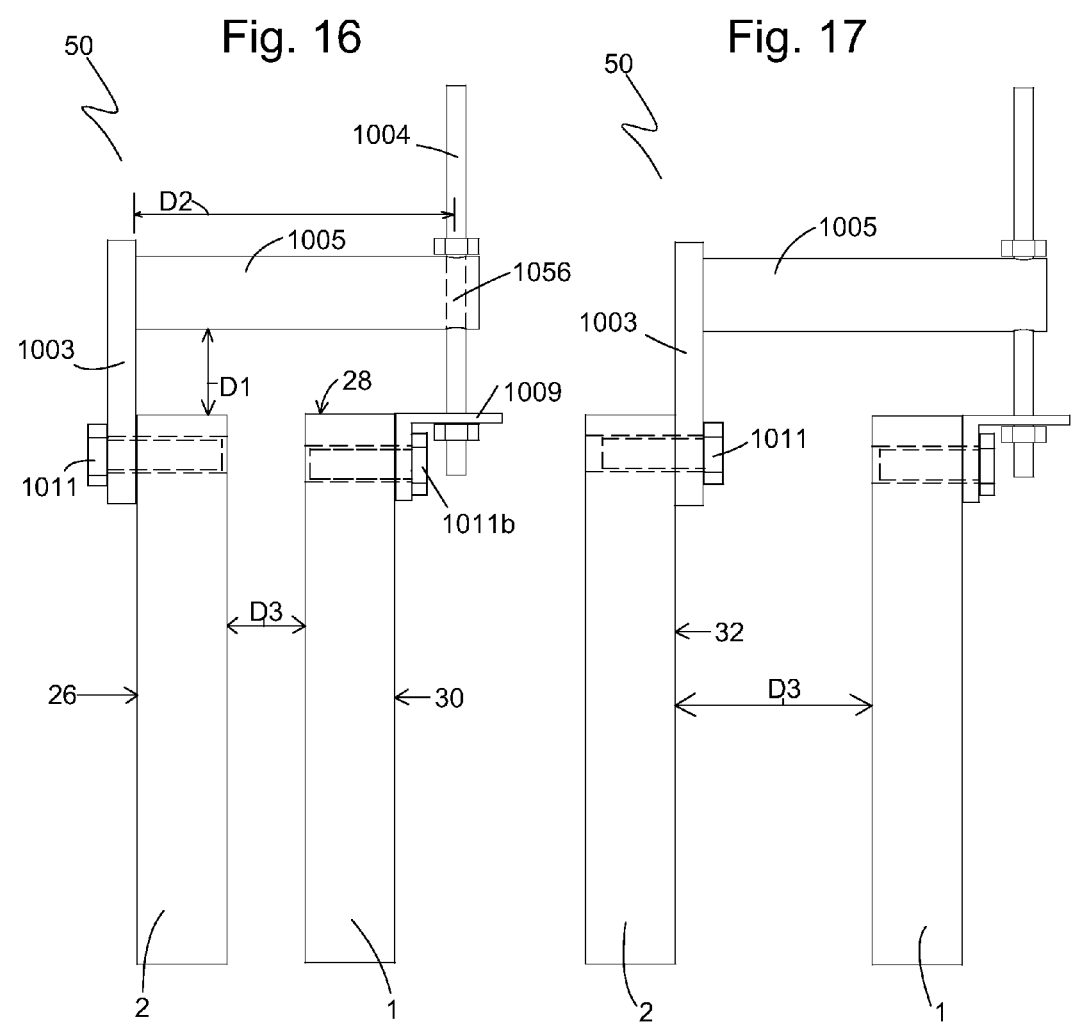

COVER ALIGNMENT TOOL

BACKGROUND OF THE INVENTION

1. Field of the Invention

The present invention relates generally to "manway" covers for access to enclosed spaces such as tanks, conduits, storage areas, heat exchanger tubes, and the like. Particularly, the present invention relates to mechanisms to assist in the removal of "manway" covers. More particularly, the present invention relates to mechanisms for handling the removal and installation of "manway" covers that are too heavy to be handled by an unaided individual.

2. Description of the Prior Art

Manway covers are typically large, heavy, metal plates that are bolted to an opening. For purposes of the present invention, the definition of "manway covers" expressly means any heavy covers or closures having a weight of thirty-five (35) pounds or more used on pressure vessels, vacuum vessels, atmospheric vessels, heat exchangers, heat exchanger channel covers, heat exchanger channels, heat exchanger bonnets, or any type of blanking plate and is not construed to be limited to only covers used on openings that are dimensionally-sized to allow passage of a man. The most common are circularly-shaped and mate to a flange by way of a plurality of bolts evenly spaced around the periphery of the opening. However, it should be understood that the heavy covers may be any shape. The defined manway covers typically provide access to enclosed spaces such as tanks, conduits, storage areas, transfer tubes, pressure vessels, vacuum vessels, atmospheric vessels, heat exchangers, heat exchanger channel covers, heat exchanger channels, heat exchanger bonnets, and the like.

Routine servicing and inspection requirements as well as other operating conditions necessitate periodic removal of these manway covers. In view of the typical location and weight of the manway covers, it is not a simple task to remove the cover or to re-install the same. Removal is currently accomplished with the use of hand operated davit swing arms, chain falls, ratchet hoists, portable hinge devices, and brute force. Except for davit swing arms and portable hinge devices, it is necessary during the removal process to lower the covers a distance to a level surface.

SUMMARY OF THE INVENTION

It is an object of the present invention to provide a simple, removable, reusable manway cover alignment tool to facilitate installation of a manway cover to a manway flange.

The alignment tool device of the present invention is used for aligning the holes/openings in the manway cover with the corresponding holes/openings in the manway body or manway flange when re-attaching a manway cover that was previously removed. Typically, when portable hinges or even fixed hinges are used to support the manway cover after removal from the manway body/flange, the weight of the manway cover often causes the hinge to deflect too much such that the fastener openings in the cover and the corresponding fastener openings in the manway body/flange no longer align. If the corresponding fastener openings no longer align, then the fasteners that are inserted through the cover openings cannot be inserted into the body/flange openings and the cover cannot be re-attached to the body/flange without great effort, which can place workers in danger due to the weight of the cover. The alignment tool of the present invention solves this problem.

The present invention achieves these and other objectives by providing an alignment tool device for use in aligning a manway cover to a manway body/flange during installation of the manway cover to the manway flange. The alignment tool includes a body/flange alignment tool plate, an alignment support structure, a cover attachment plate, and a height adjuster.

In one embodiment, the alignment tool includes a pair of plates with openings in each plate where the openings are spaced for alignment with manway cover bolt openings and/or manway flange bolt openings. Each plate has a tongue fixedly attached to each respective plate and extending transversely from the plate where the tongues of a pair of plates are positioned to be parallel, extend opposed to each other and overlap when one of the pair of plates is removably mounted on a manway cover and the other of the pair of plates is removably mounted on a corresponding manway flange. The extending tongue of the plate mounted to the manway cover includes a height adjuster mechanism that contacts the tongue on the flange plate. The height adjuster mechanism is adjustable along an adjuster longitudinal axis of the height adjuster where the adjuster longitudinal axis is transverse to the longitudinal axis of the tongues and orthogonal to opening in the pair of plates.

In one embodiment of the present invention, an alignment tool device includes a removable cover alignment plate, a removable flange alignment plate, and a height adjuster. The removable cover alignment plate defines a longitudinal plane where the cover alignment plate has an elongated cover plate body, an upper plate portion connected to the cover plate body and extending along the longitudinal plane, and a cover plate tongue that extends from the upper plate portion in a transverse orientation from the longitudinal plane. The cover plate body has an inside cover body edge, an outside cover body edge, and a pair of spaced-apart body openings located a predefined distance from the outside cover body edge.

The removable flange alignment plate defines a longitudinal plane where the flange alignment plate has an elongated flange plate body, a lower plate portion connected to the flange plate body and extending along the longitudinal plane, and a flange plate tongue that extends from the lower plate portion in a transverse orientation from the longitudinal plane. The flange plate body has an inside flange body edge, an outside flange body edge and a pair of spaced-apart body openings located a predefined distance from the outside flange body edge.

The height adjuster extends transversely through the cover plate tongue along a height adjuster longitudinal axis that is parallel to the longitudinal plane. The height adjuster is capable of longitudinal displacement along the height adjuster longitudinal axis relative to the cover plate tongue whereby the cover plate tongue is parallel to, above, and opposed to the flange plate tongue. When the cover alignment plate is attached to a manway cover and when the flange alignment plate is attached to a manway flange, the cover plate tongue extends towards a space defined by the lower plate portion of the flange plate and the inside flange plate edge. Similarly, the flange plate tongue extends towards a space defined by the upper plate portion of the cover plate and the inside cover plate edge. The height adjuster contacts the flange plate tongue to provide spatial, vertical displacement of the cover plate tongue relative to the flange plate tongue for adjustably aligning a plurality of manway cover bolt openings with a plurality of corresponding manway flange bolt openings.

In another embodiment of the present invention, the removable cover alignment plate includes a bracing gusset directly connected to the cover tongue and the upper plate portion of the cover plate body.

In still another embodiment of the present invention, the removable flange alignment plate includes a bracing gusset directly connected to the flange tongue and the lower plate portion of the flange plate body.

In one embodiment, the alignment tool includes a body/flange alignment tool plate, a tool beam support, a cover attachment plate, and a height adjuster. The body/flange alignment tool plate includes a plate body having a first planar surface and a plurality of plate openings each spaced from the first edge, where each plate opening is positioned to align with a corresponding opening in the manway body/flange. The tool beam support has a distal end portion and extends a predefined distance transversely from the tool alignment plate. The cover attachment plate has at least one through-opening sized and positioned for attachment of the cover attachment plate to the manway cover. The height adjuster extends between and connects the tool beam support to the cover attachment plate.

In another embodiment, the cover attachment plate has a first plate portion and a second plate portion extending transversely from the first plate portion to define an L-shape. The first plate portion is capable of a removable connection to the height adjuster and the second plate portion includes the through-opening(s) for attachment to the manway cover.

In another embodiment, the height adjuster is moveable along a predefined length of the tool beam support.

In another embodiment, the tool beam support includes one of a track for longitudinal movement of the height adjuster relative to the tool beam support and a slot through the tool beam support. In one embodiment, the track is on an outside surface of the tool beam support. In another embodiment, the track is on an inside surface of the tool beam support.

In another embodiment, at least one of the plate openings is an elongated slot.

In another embodiment, the tool beam support extends substantially perpendicularly from the first planar surface of the tool alignment plate.

In another embodiment, the height adjuster includes a threaded rod. In one embodiment, the tool beam support defines a threaded through-opening in the distal end portion for threaded engagement with the threaded rod. In another embodiment, the height adjuster further comprises a handle attached to a proximal end of the height adjuster, where the handle adapted to threadably advance the tool adjuster through the threaded through-opening in the distal end portion of the tool beam support.

In another embodiment, the height adjuster is positioned along the tool beam support a predefined distance from the tool alignment plate.

In another embodiment, a horizontal distance between the cover attachment plate and the body/flange alignment tool plate is adjustable. The horizontal distance may be adjusted, for example, by moving the height adjuster along the tool beam support.

In another embodiment, the alignment tool also includes a set-screw flange extending transversely from the tool alignment plate and defining a set-screw opening extending through the set-screw flange. A set screw is adapted to extend through and threadably engage the set-screw opening.

The alignment tool device of the present invention is used for aligning the holes/openings in the manway cover with the corresponding holes/openings in the manway body or manway flange when re-attaching a manway cover that was previously removed. Typically, when portable hinges or even fixed hinges are used to support the manway cover after removal from the manway body/flange, the weight of the manway cover often causes the hinge to deflect too much such that the fastener openings in the cover and the corresponding fastener openings in the manway body/flange no longer align. If the corresponding fastener openings no longer align, then the fasteners that are inserted through the cover openings cannot be inserted into the body/flange openings and the cover cannot be re-attached to the body/flange without great effort, which can place workers in danger due to the weight of the cover. The alignment tool of the present invention solves this problem. This is best explained by describing how the present invention is used.

The body/flange alignment tool plate is secured to either a manway body or mating flange to which a manway cover is attached or attachable. The plate opening is used to secure the body/flange alignment tool plate to the manway body or mating flange. Even though a single plate opening is sufficient, the use of two plate openings to secure the body/flange alignment tool plate to two corresponding openings in the manway body or mating flange reduces the likelihood of pivoting movement of the body/flange alignment tool plate relative to the manway body or mating flange once attached. One of the plate openings may be an elongated slot to further facilitate alignment of the openings in the body/flange alignment tool plate with the corresponding openings in the manway body or mating flange. Fasteners or pins secure the tool plate to the manway body/flange. The cover attachment plate is attached to the manway cover also using a fastener or pin. When the tool plate is attached to the manway body/flange, the alignment support structure extends across and a predefined distance from the outside, circumferential edge of the manway cover and the cover attachment plate. The height adjuster is inserted through the alignment support structure at a through opening designated for the height adjuster. The height adjuster extends towards and connects to the cover attachment plate in such a way so that the height adjuster is capable of moving the manway cover relative to the manway body/flange for the purpose of aligning the plurality of openings in the manway cover with the plurality of openings in the manway body/flange.

To align the cover fastener openings with the manway body/flange openings, the height-adjusting nut is rotated clockwise or counterclockwise, whatever the case may be, to raise or lower the manway cover relative to the alignment support structure. Once aligned, the standard cover fasteners that were removed to separate the cover from the manway body/flange are installed and the cover is then secured. It is contemplated that the body/flange alignment tool plate may be permanently attached to the manway body/flange if desired by means of fasteners or welding.

Another aspect of the present invention relates to a method of aligning a manway cover to a manway body/flange. In one embodiment, the method includes providing a tool alignment device that includes a tool alignment plate having a plurality of plate openings each spaced from a first edge of a plate body and a tool beam support extending transversely from the tool alignment plate, a cover attachment plate having at least one cover plate opening sized and positioned to align with a corresponding manway cover opening in the manway cover, and a height adjuster extending between and connecting the tool beam support to the cover attachment plate where a distance between the tool beam support and the cover attachment plate is adjustable using the height adjuster. The method also includes attaching the tool alignment plate to the manway body/flange, attaching the cover attachment plate to the manway cover, and adjusting the position of the height adjuster to raise or lower the cover attachment plate, thereby adjusting the vertical position of the manway cover openings for alignment with the corresponding manway body or mating flange openings.

In another embodiment of the method, the step of providing a tool alignment device includes selecting a height adjuster that is a threaded rod.

In another embodiment of the method, the step of providing a tool alignment device includes selecting a tool alignment plate where at least one of the plate openings is an elongated slot.

In another embodiment of the method, the step of providing the alignment tool includes selecting the alignment tool having a set-screw flange extending transversely from a first planar surface of the plate body and defining a threaded opening for threadably receiving a set screw therethrough. The step of attaching the tool alignment plate to the manway body/flange includes installing a fastener through at least one of the plurality of plate openings and into a corresponding opening in the manway body/flange. The step of attaching the tool alignment plate to the manway body/flange also includes advancing the set screw through the threaded opening through the set-screw flange to engage the set screw with a circumferential edge of the manway body/flange, thereby forcing the at least one fastener against an inside surface of the corresponding opening in the manway body/flange.

In another embodiment of the method, the step of attaching the cover attachment plate to the manway cover includes installing a fastener through each of the at least one cover plate opening and into a corresponding opening in the manway cover.

BRIEF DESCRIPTION OF THE DRAWINGS

FIG. 10 is an outside view of the embodiment shown in FIG. 9.

FIG. 11 is an inside view of the embodiment shown in FIG. 9.

FIG. 16 is a side elevation view of an alignment tool of present invention showing the body/flange alignment tool plate connected to an outside surface of a manway body/flange.

FIG. 17 is a side elevation view of an alignment tool of the present invention showing the body/flange alignment tool plate connected to an inside surface of a manway body/flange.

DETAILED DESCRIPTION OF THE PREFERRED EMBODIMENT

Figure 1:
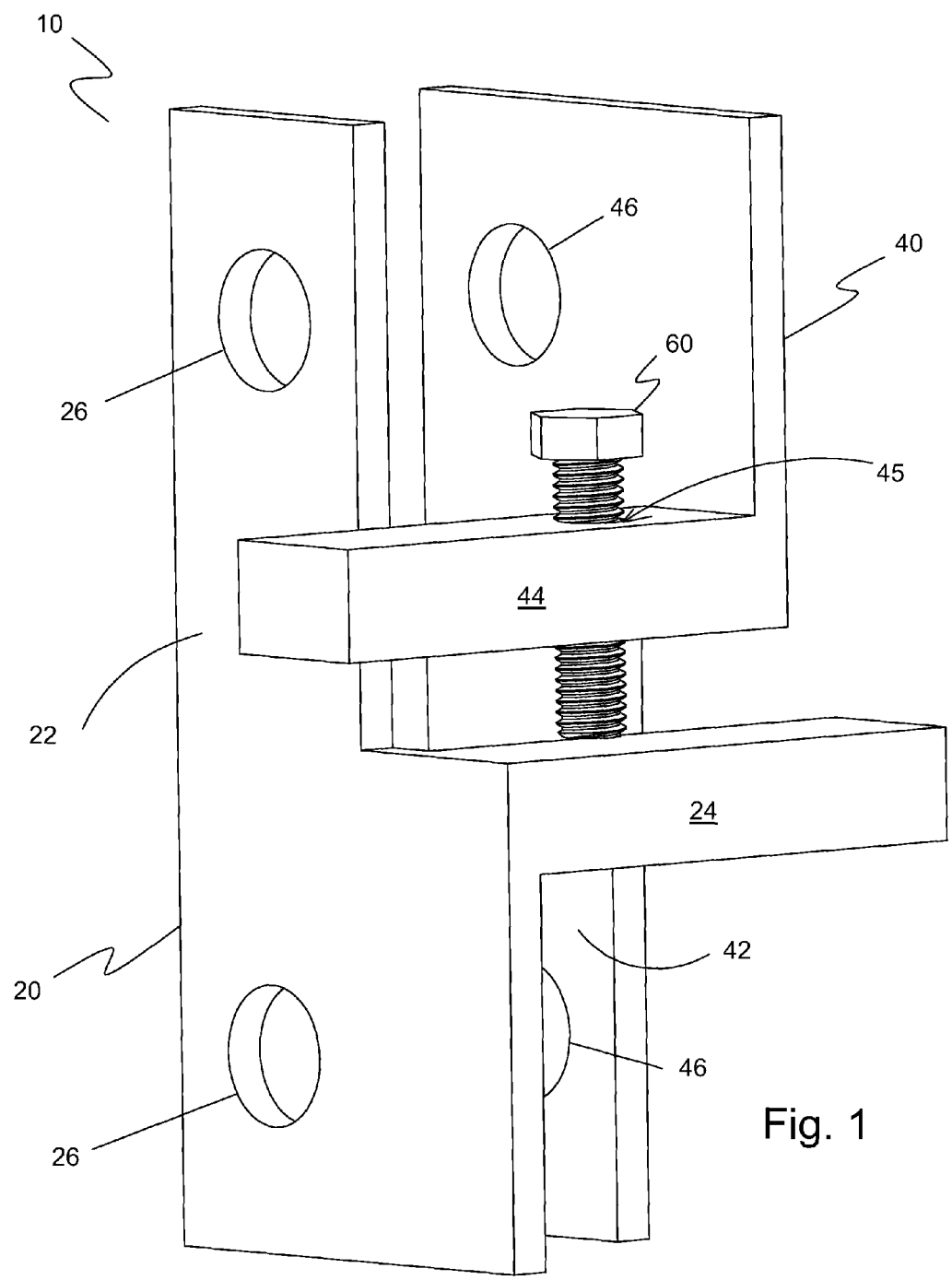
FIG. 1 is a perspective view of one embodiment of the present invention showing the cover plate, the flange plate and the height adjuster.

The preferred embodiments of the present invention are illustrated in FIGS. 1-23. FIG. 1 shows one embodiment of a cover alignment tool 10 of the present invention. Cover alignment tool 10 has a flange plate 20, a cover plate 40 and a height adjuster 60. Flange plate 20 has a flange plate body 22 and a plurality of openings 26 for receiving a pin (shown in FIG. 12) that secures flange plate 20 to a manway flange. Cover plate 40 has a cover plate body 42 and a plurality of body openings 46 also for receiving a pin (shown in FIG. 12) that secures the cover plate 40 to a manway cover that attaches to the manway flange. Flange plate 20 has an alignment support structure 200. In this embodiment, alignment support structure 200 is a flange plate tongue 24 that is fixedly attached to flange plate 20 and that extends in a transverse orientation from flange plate body 22. Cover plate 40 has a cover plate tongue 46 that is fixedly attached to cover plate 40 and that extends in a transverse orientation from cover plate body 42. Cover plate tongue 44 has a tongue opening 45 for receiving height adjuster 60, which height adjuster 60 is oriented orthogonal to the openings 26, 46. Preferably, tongue opening 45 is threaded and threadably receives height adjuster 60.

Figure 2:
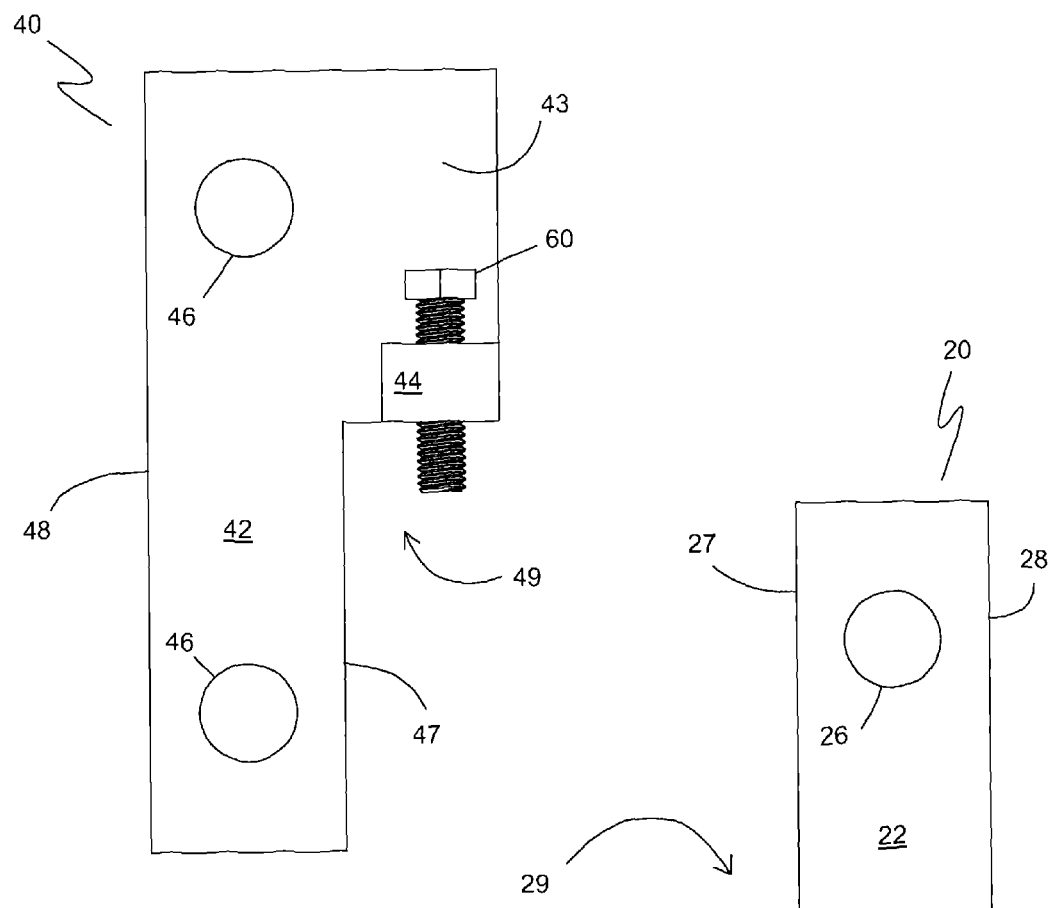
FIG. 2 is a front view of one embodiment of the cover plate shown in FIG. 1

FIG. 2 illustrates a front view of cover plate 40. As shown, cover plate body 42 has an inside cover body edge 48, an outside cover body edge 47, a plurality of spaced-apart body openings 46 located a predefined distance from outside cover body edge 47, and an upper plate portion 43. Upper plate portion 43 is co-planar with cover plate body 42 and extends from outside cover body edge 47. In one embodiment, upper plate portion 43 and cover plate body 42 together define an inverted-L shape when cover plate 40 is oriented as shown in FIG. 2. Cover plate tongue 44 extends from upper plate portion 43 in a transverse orientation toward the viewer out of the plane of FIG. 2. Height adjuster 60 threadably engages and is threadably adjustable in position relative to cover plate tongue 44. Upper plate portion 43 and outside cover plate edge 47 define a space 49 below upper plate portion 43.

Figure 3:
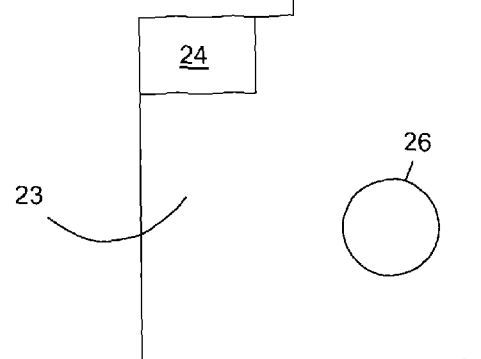
FIG. 3 is a front view of one embodiment of the flange plate shown in FIG. 1

FIG. 3 illustrates a front view of flange plate 20. As shown, flange plate body 22 has an inside flange body edge 28, and outside flange body edge 27, a plurality of spaced-apart body openings 26 located a predefined distance from outside flange body edge 27, and a lower plate portion 23. Lower plate portion 23 is co-planar with flange body 22 and extends from outside flange body edge 27. In one embodiment, lower plate portion 23 and flange body 22 together define an L-shape. Flange plate tongue 24 extends from lower plate portion 23 in a transverse orientation toward the viewer out of the plane of FIG. 3. Lower plate portion 23 and outside flange plate edge 27 define a space 29 above lower plate portion 23.

In one embodiment, flange plate 20 is substantially identical to cover plate 40 with exception of threaded opening 45 that extends through cover plate tongue 44 and the orientation of each when flange plate 20 is assembled with cover plate 40.

Figure 4:
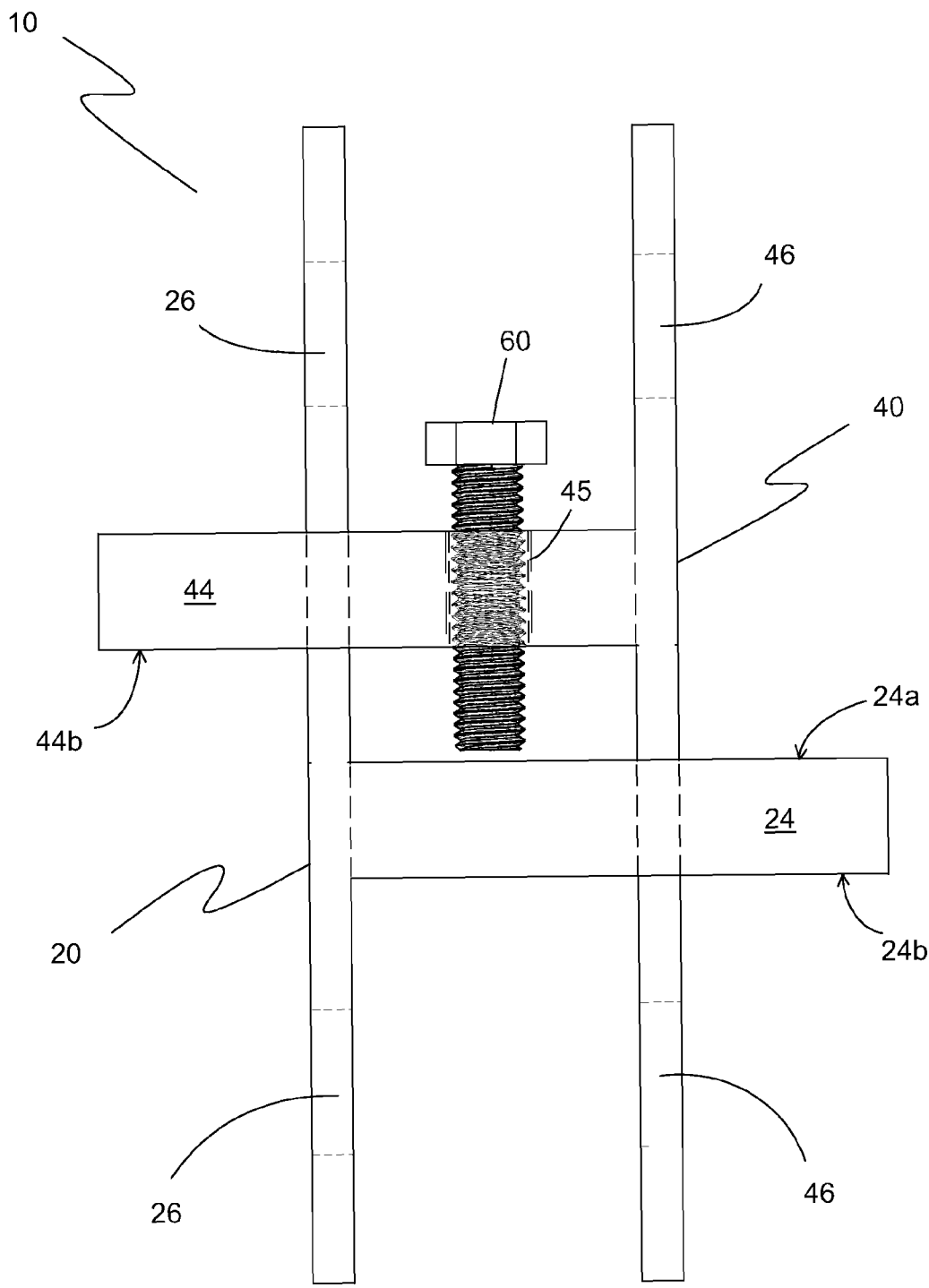
FIG. 4 is an outside view of the embodiment shown in FIG. 1.

FIG. 4 illustrates an outside view of flange plate 20, cover plate 40 and height adjuster 60. In use, height adjuster 60 would contact the top surface 24a of flange plate tongue 24 in order to vertically adjust a cover attached to cover plate 40 in order to align the cover openings in the manway cover with their respective flange openings in the manway flange. Although flange plate tongue 24 and cover plate tongue 44 are shown to extend beyond the opposed cover plate 40 and flange plate 20, respectively, the tongues 24, 44 may extend any predefined length so long as the tongues 24, 44 overlap sufficient for height adjuster 60 to engage both tongues and the overlap is sufficient to accomplish the purpose of aligning the cover openings of a manway cover with the respective flange openings of a manway flange. For example, cover plate tongue 44 may be a fixed size since it incorporates height adjuster 60, which is typically threadably fixed into and extends through a single, threaded opening 45 in cover plate tongue 44. Cover plate tongue 44, however, may have more than one threaded opening 45 in a longer extending tongue that provides the user with optional locations for threadably attaching height adjuster 60 to cover plate tongue 44. Flange plate tongue 24, in this embodiment, would extend with sufficient length to provide height adjuster 60 a contact surface (e.g., top surface 24a) on which height adjuster 60 makes contact for adjustably moving cover plate 40 vertically relative to flange plate 20. It should be understood by the skilled artisan that flange plate tongue 24 of flange plate 20 may alternatively incorporate a threaded opening (not shown) for threadably receiving height adjuster 60. In this alternative embodiment, height adjuster 60 would enter flange plate tongue 24 from the bottom surface 24b of flange plate tongue 24 and would contact the bottom surface 44b of cover plate tongue 44 in order to provide a similar adjustment to the vertical position of the cover to align the cover openings with their respective flange openings.

In one embodiment, height adjuster 60 is a double-ended threaded stud configured to threadably engage both of cover plate tongue 44 and flange plate tongue 24. One end of height adjuster 60 threadably engages a threaded opening 45 in cover plate tongue 44; the other end of height adjuster 60 threadably engages a threaded opening 45a in flange plate tongue 24. Similar to a turnbuckle, when the double-ended threaded stud is rotated in one direction, it causes the cover plate tongue 44 and the flange plate tongue 24 to move towards each other. When the double-ended threaded stud is rotated in the opposite direction, it causes tongues 24, 44 to move away from each other.

Figure 5:
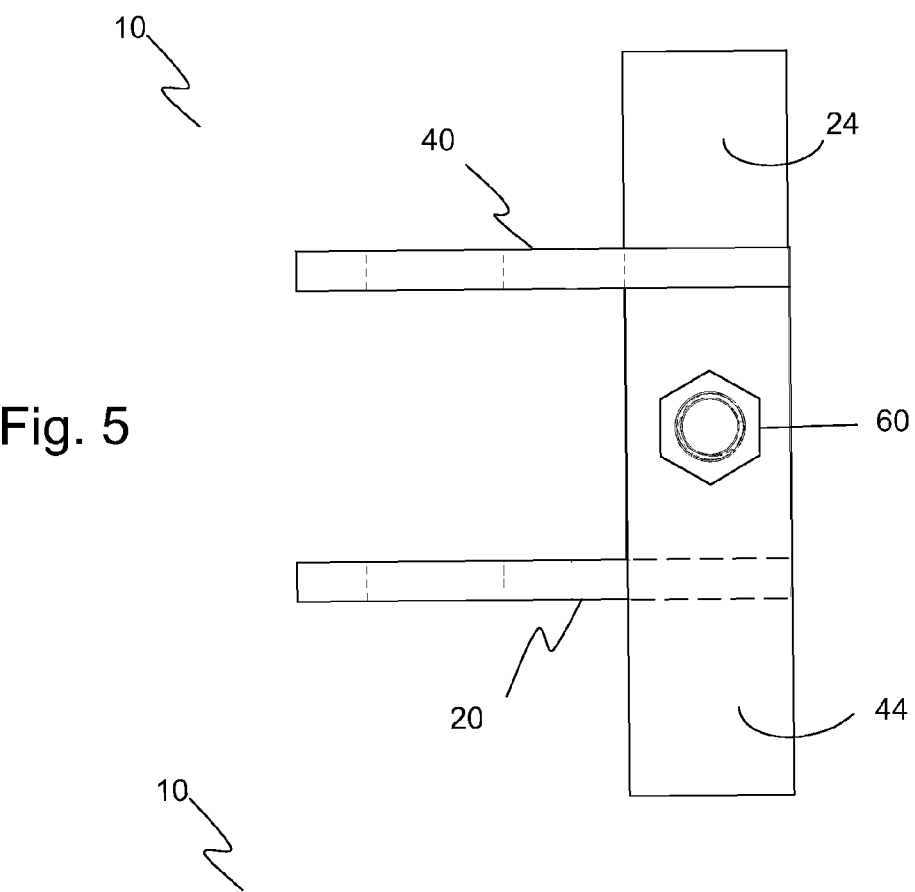
FIG. 5 is a top view of the embodiment shown in FIG. 1.
Figure 6:
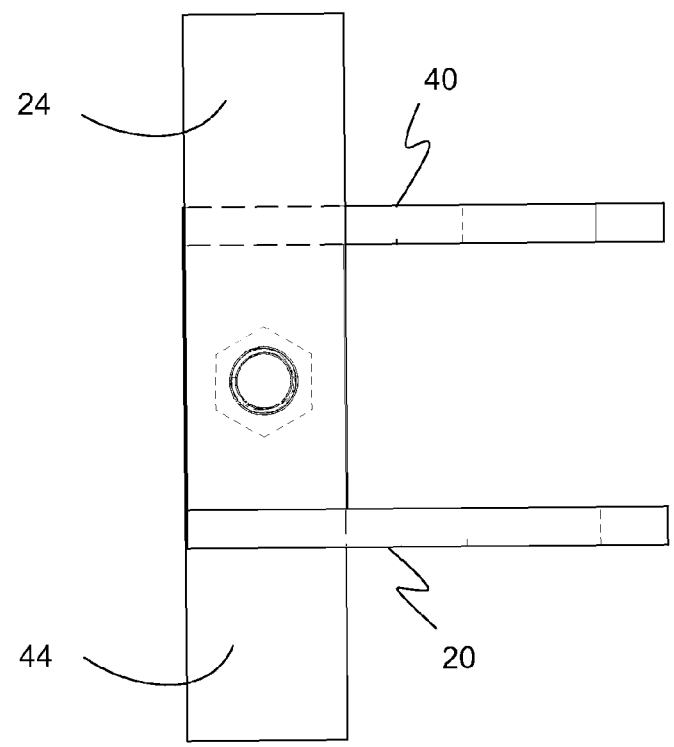
FIG. 6 is a bottom view of the embodiment shown in FIG. 1.
Figure 7:
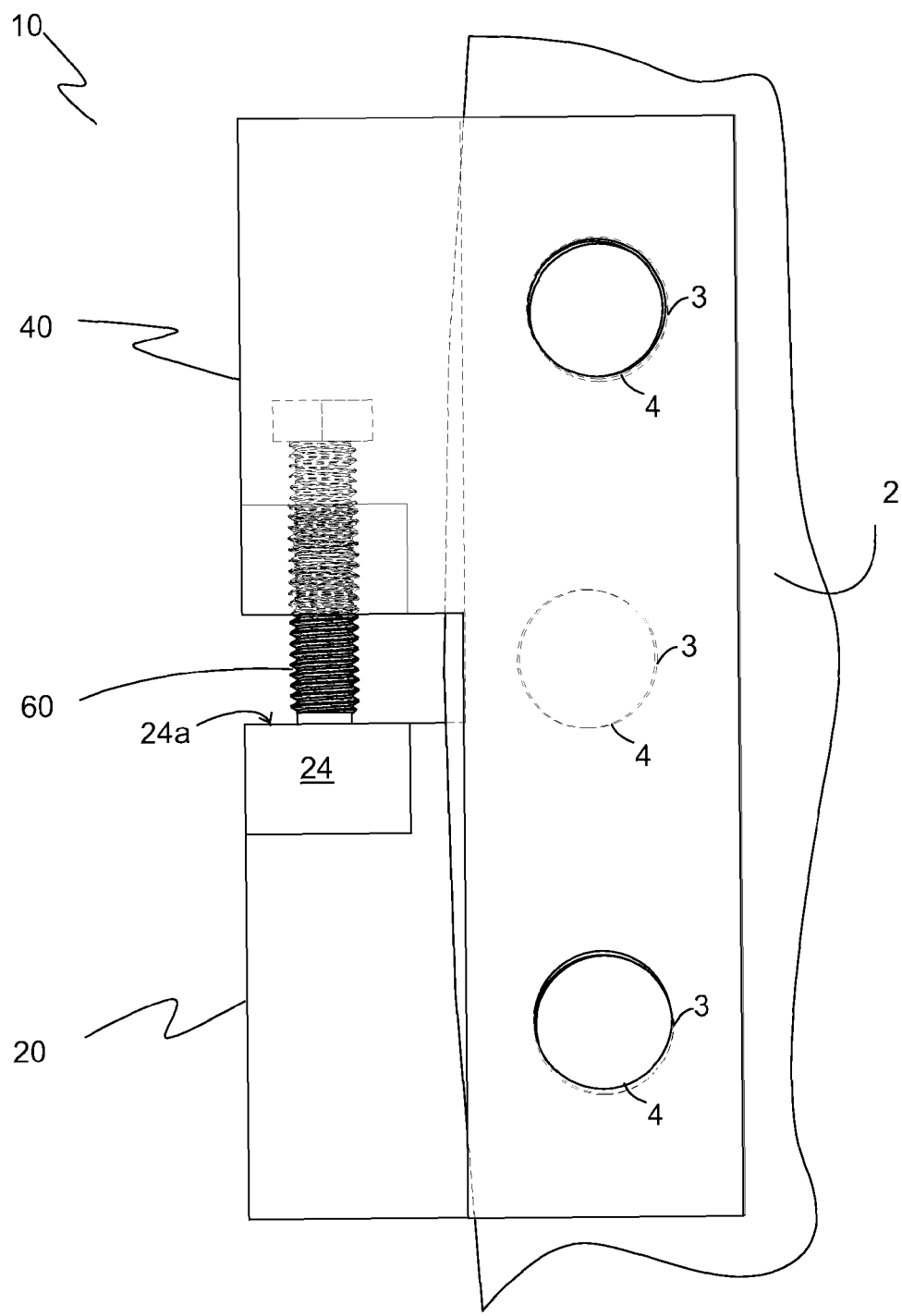
FIG. 7 is a cover-side view showing the cover and flange relative to the cover alignment tool.
Figure 8:
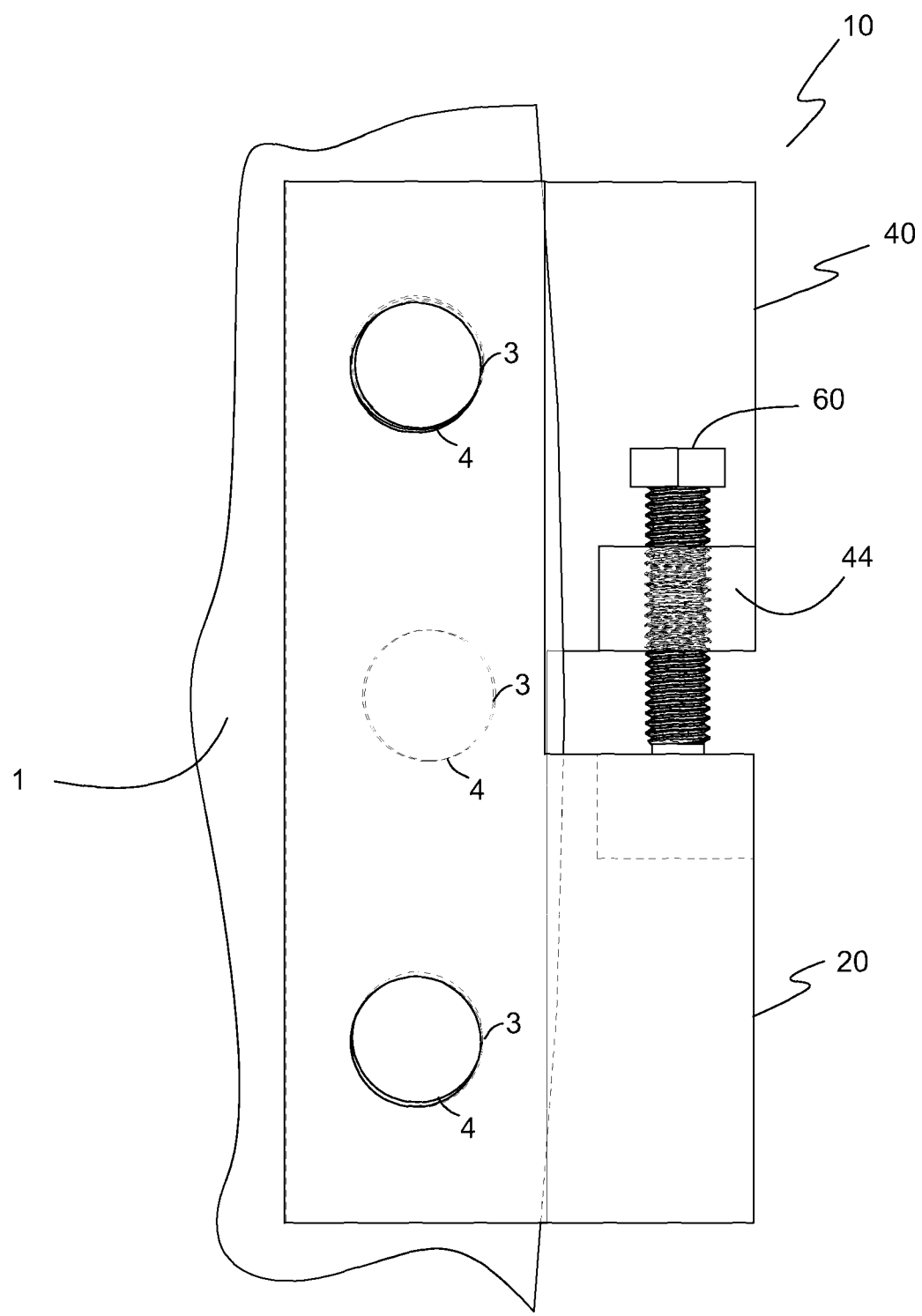
FIG. 8 is a cover-side view showing the cover and flange relative to the cover alignment tool.

FIG. 5 illustrates a top view of cover alignment tool 10 while FIG. 6 illustrates a bottom view of cover alignment tool 10. FIG. 7 illustrates a cover-side view of cover alignment tool 10 with the openings 3 of a cover 2 aligned with the openings 4 in a flange 1 (shown in FIG. 8). As shown in the embodiment of FIG. 7, height adjuster 60 contacts the top surface 24a of flange plate tongue 24 (or is capable of contacting top surface 24a by advancing height adjuster 60 through threaded opening 45). FIG. 8 illustrates a flange side view of cover alignment tool 10 shown in FIG. 7 with the openings 4 of flange 1 aligned with the openings 3 of cover 2 (not shown). Openings 3, 4 also align with openings 26, 46 of flange plate 20 and cover plate 40, respectively.

Figure 9:
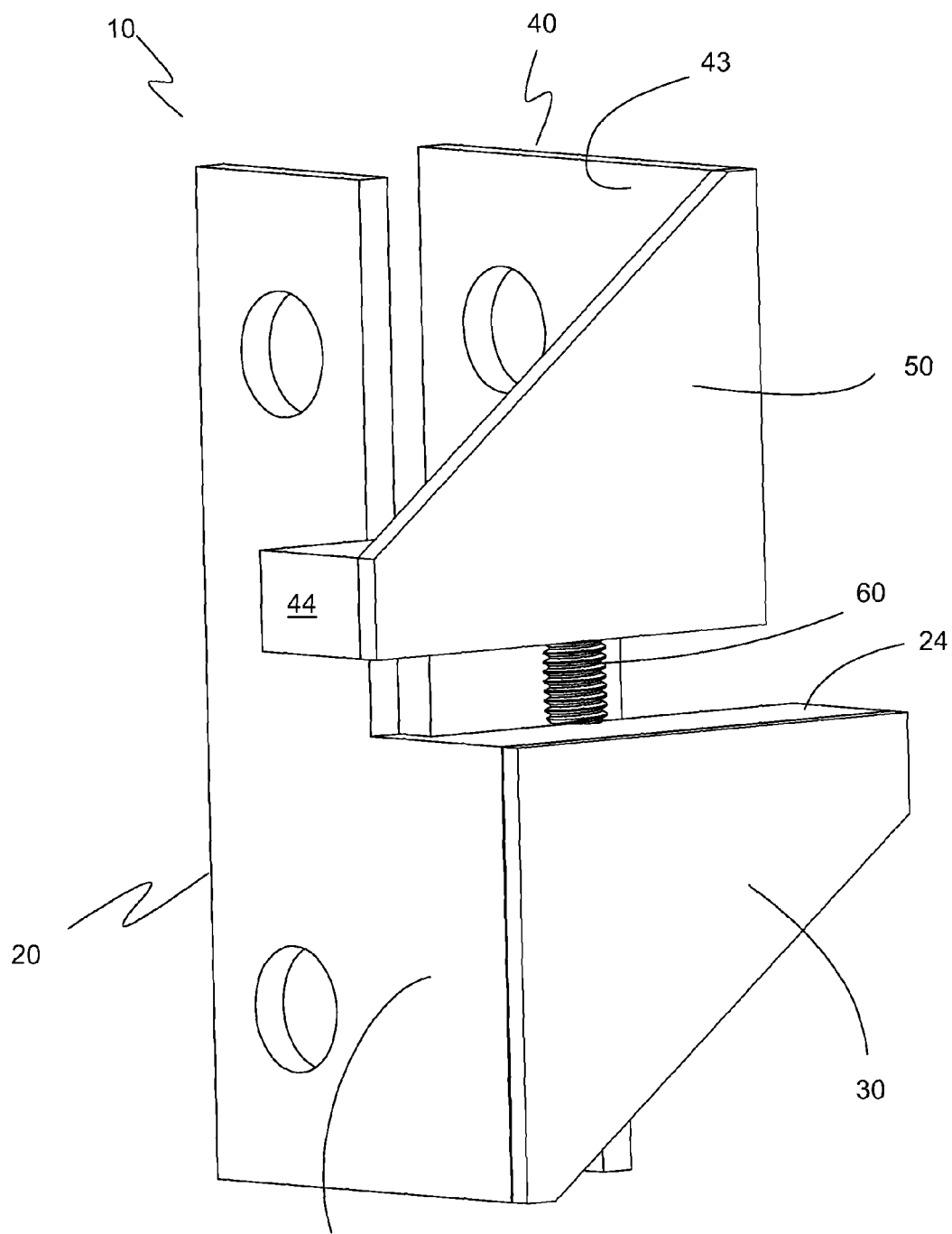
FIG. 9 is a perspective view of another embodiment of the present invention showing the cover plate and flange plate with gussets.

FIG. 9 illustrates a perspective view of another embodiment of the present invention. For consistency, the same structural features in this embodiment use the same reference numbers for similar structural features in the embodiment shown in FIG. 1. In this embodiment, cover alignment tool 10 has flange plate 20, cover plate 40, height adjuster 60, an optional flange gusset 30, and an optional cover gusset 50. Optional flange gusset 30 provides additional reinforcement between lower flange portion 23 and flange tongue 24. Like flange gusset 30, optional cover gusset 50 provides additional reinforcement between upper cover portion 43 and cover tongue 44. Gussets 30, 50 preferably are a generally planar sheet having the general shape of a right triangle that extends along the respective flange plate tongue 24 or cover plate tongue 44 and along the respective lower plate portion 23 or upper plate portion 43. Gussets 30, 50 are preferably made of metal.

Gusset 30 is typically and preferably welded to flange plate tongue 24 and to lower plate portion 23. Similarly, gusset 50 is typically and preferably welded to cover plate tongue 44 and to upper plate portion 43. Other attachment means are acceptable, including the use of fasteners, brackets, and the like. Because the weight of manway covers vary with some covers weighing many times more than others, gussets 30, 50 each adds additional strength and rigidity to the respective tongues 24, 44 since tongues 24, 44 endure the full weight of cover 2 when a cover height adjustment is performed. Gussets 30, 50 help prevent and/or minimize potential bending of tongues 24, 44 during the cover height adjustment process.

FIGS. 10 and 11 illustrate outside and inside views, respectively, of the gusseted cover alignment tool 10. It is noted that gussets 30, 50 may be any size desired even though they are illustrated as a triangularly-shaped structure extending over the entire length of their respective tongues 24, 44 and between the top and bottom perimeter edges of the respective lower and upper portions 23, 43.

Figure 12:
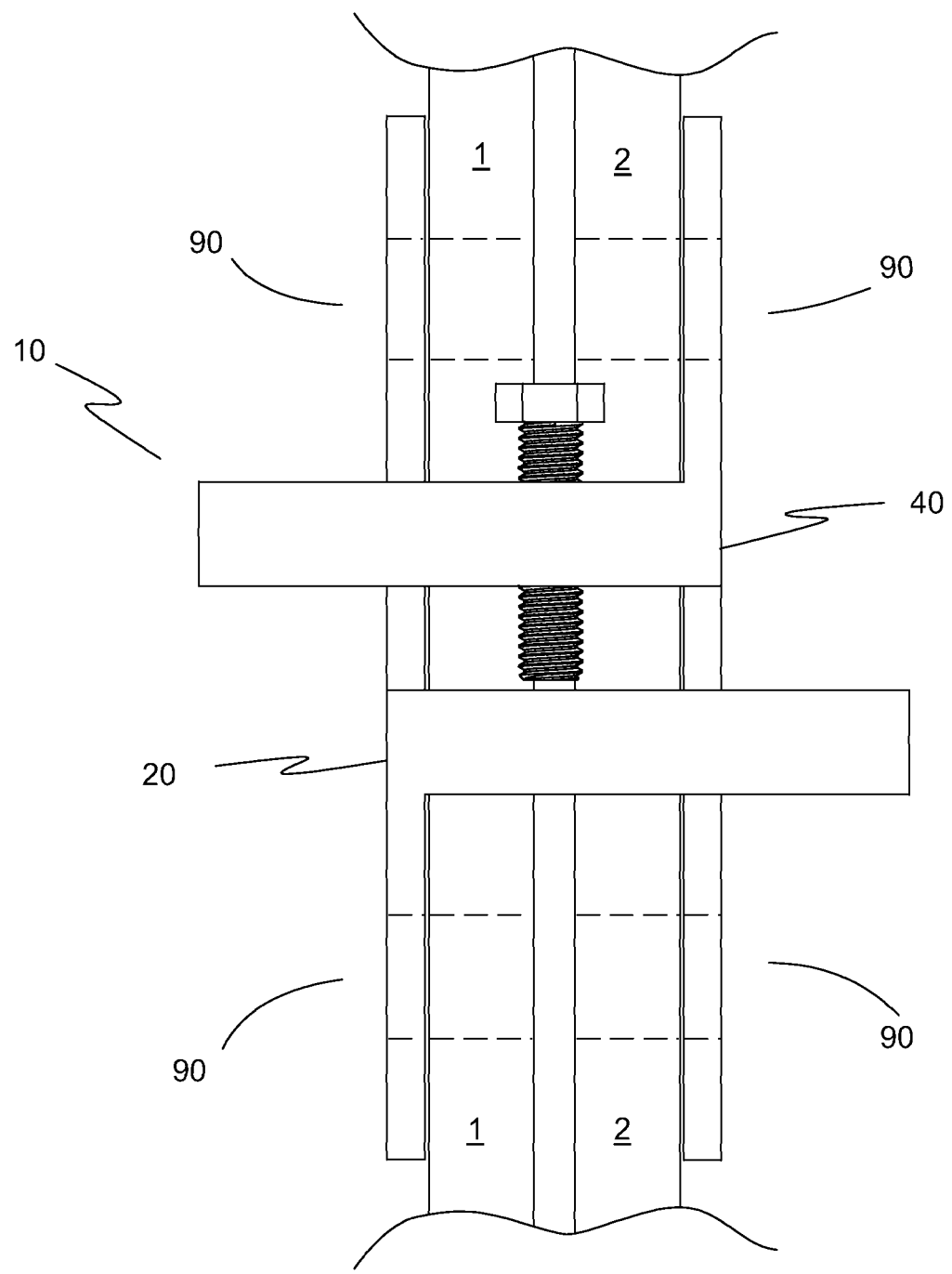
FIG. 12 is an outside view of the embodiment shown in FIG. 1 including a partial view of the cover, flange and pins.

FIG. 12 illustrates an outside view of cover alignment tool 10 with a partial view of flange 1 and cover 2 with pins 90 securing flange plate 20 to flange 1 and securing cover plate 40 to cover 2.

Figure 13:
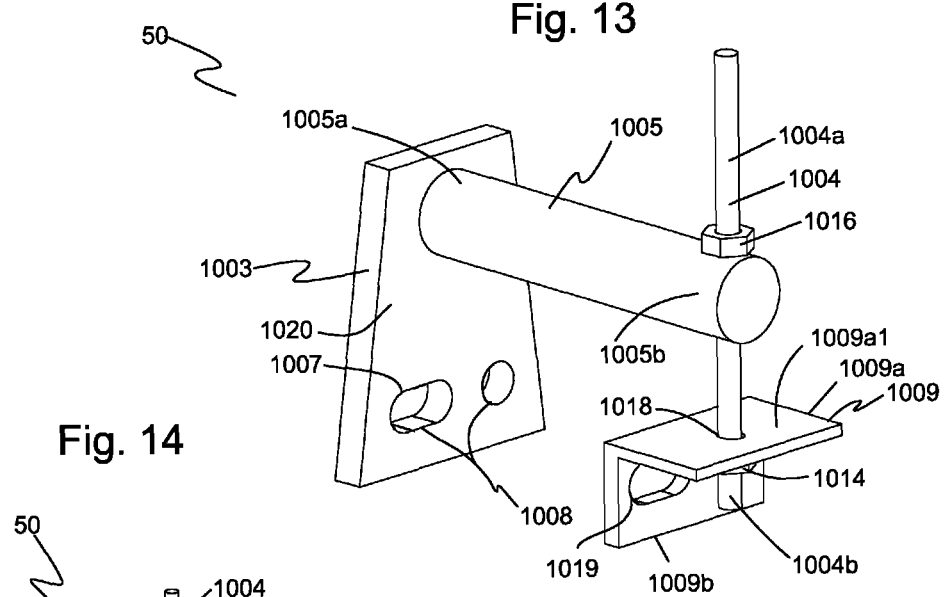
FIG. 13 is a front perspective view of one embodiment of an alignment tool of the present invention.

FIG. 13 illustrates a front perspective view of another embodiment of an alignment tool 50 of the present invention. Alignment tool 50 includes a body/flange alignment tool plate 1003, a tool beam support 1005, a cover attachment plate 1009, and a height adjuster 1004. Body/flange alignment tool plate 1003 has the tool beam support 1005 extending a predefined distance transversely from body/flange alignment tool plate 1003. In one embodiment, tool beam support 1005 is a solid cylindrical bar made of steel or other rigid materials that is attached to a plate body 1020 by welding or threaded engagement at a proximal end portion 1005a. Other shapes of tool beam support 1005 are acceptable, such as a tube (round, square, etc.), an angle bar, a plate, an I-beam, and the like.

A plurality of plate openings 1008 extend through body/flange alignment tool plate 1003. In one embodiment, at least one of plate openings 1008 is an elongated slot to facilitate alignment of plate openings 1008 with openings in a manway body/flange 1002 (shown in FIG. 2). Body/flange alignment tool plate 1003 may have more or fewer plate openings 8 depending on the size and configuration of the manway body/flange 1002.

Height adjuster 1004 extends through an opening 1056 (shown in FIG. 16) that extends transversely through distal end portion 1005b of tool beam support 1005. Height adjuster 1004 also extends through cover attachment plate 1009 spaced from distal end portion 1005b. In one embodiment, height adjuster 1004 is a threaded rod and opening 1056 is a smooth bore. In another embodiment, opening 1056 is also threaded for threaded engagement with threaded height adjuster 1004.

In one embodiment, an adjustment nut 1016 installed on proximal end 1004a of height adjuster 1004 (e.g., theaded rod) is used to advance height adjuster 1004 in order to change the vertical position of cover attachment plate 1009. For example, with adjustment nut 1016 abutting distal end 1005b of tool beam support, the user rotates adjustment nut 1016 to raise or lower height adjuster 1004. In other embodiments, height adjuster 1004 is a threaded rod threadably engaged in opening 1056 (also threaded; shown in FIG. 16) through tool beam support 1005. A wheel, handle, pin extending through height adjuster 1004, T-handle, tool (e.g., wrench), or other structure attached to or engaging height adjuster 1004 is used to advance height adjuster 1004 through tool beam support 1005 by rotating threaded height adjuster 1004 in threaded opening 1056.

In one embodiment, cover attachment plate 1009 has an L-shape with a first cover plate portion 1009a and second cover plate portion 1009b. First cover plate portion 1009a extends transversely or substantially perpendicularly to a second cover plate portion 1009b while a planar surface 1009a1 of first cover plate portion is substantially parallel to tool beam support 1005. First cover plate portion 1009a has a first portion opening 1018 to receive height adjuster 1004. In one embodiment, first portion opening 1018 is threaded to releasably engage height adjuster 1004 that is a threaded rod. In such an embodiment, a retaining fastener 1014 such as a nut is optional. In another embodiment, height adjuster 1004 is received in first portion opening 1018 and fixed in place by welding to first cover plate portion 1009a and/or second cover plate portion 1009b. Second cover plate portion 1009b has at least one second portion opening 1019 that is/are sized and spaced to align with openings in manway cover Retaining fastener 1014 on a distal end 1004b of height adjuster 1004 maintains cover attachment plate 1009 attached to height adjuster 1004. Retaining fastener 1014 may be a threaded nut, a pin, a plate, or other structure that attaches to or extends through distal end 1004b of height adjuster 1004 to prevent height adjuster 1004 from separating from or disengaging with cover attachment plate 1009. In another embodiment, distal end 1004b of height adjuster 1004 is secured to cover attachment plate 1009 by threaded engagement, welding, or other means.

In another embodiment, cover attachment plate 1009 is a flat plate (e.g., without first cover plate portion 1009a) to which height adjuster 1004 is attached by welding, fasteners, clamps, threaded engagement, or other means. For example, height adjuster 4 extends along and is welded to one face of cover attachment plate 1009 between a pair of second portion openings 1019. In another example, retaining fastener 1014 is welded to a top edge or other portion of cover attachment plate 1009 and is positioned to threadably receive height adjuster 1004.

Figure 14:
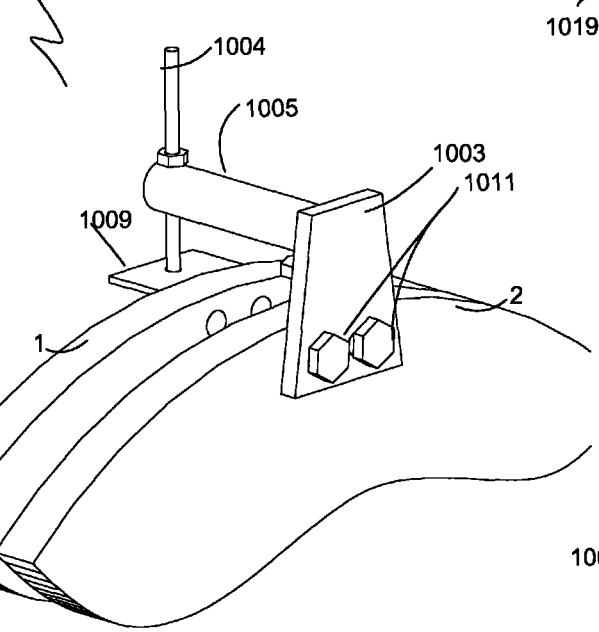
FIG. 14 is a rear perspective view of the alignment tool of FIG. 13 shown installed on a manway frame/flange and on a manway cover.

FIG. 14 is a rear perspective view of alignment tool 50 of FIG. 13 shown with body/flange alignment tool plate 1003 attached to manway body/flange 2 using fasteners 1011 extending through plate openings 1008 (not visible) and into manway body/flange 2. Cover attachment plate 1009 is similarly attached to a manway cover 1. Preferably, fasteners 1011 are threaded bolts that extend through openings in manway body/flange 2 and manway cover 1 to engage corresponding threaded openings or extend through corresponding through-openings in manway body/flange 2 and manway cover 1, respectively.

Figure 15:
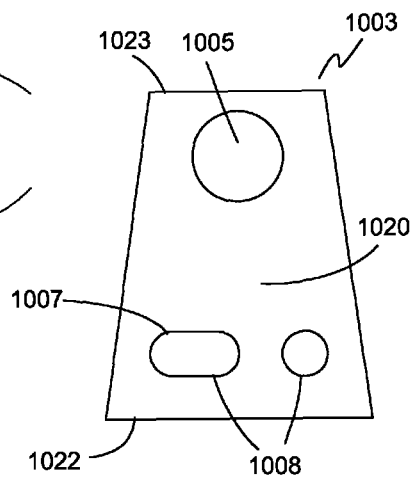
FIG. 15 is a front elevation view of one embodiment of an body/flange alignment tool plate of the present invention.

FIG. 15 is a front elevation view of one embodiment of body/flange alignment tool plate 1003 with tool beam support 1005. Tool plate 1003 has a plate body 1020 with a lower or first edge 1022 and an upper or second edge 1023. In one embodiment, plate body 1020 is a steel plate with a trapezoidal shape for ease and economy of manufacture. Plate openings 1008 are positioned adjacent first edge 1022 and tool beam support 1005 is positioned near second edge 1023. Other shapes of plate body 1020 are acceptable, such as rectangular, arcuate, or other shapes. In some embodiments, first edge 1022 is arcuate to generally match the rounded shape of some manway body/flanges 1002. Plate openings 1008 extend through plate body 1020. Preferably, one of plate openings 1008 is an elongated slot 1007. Plate openings 1008 are used to fasten body/flange alignment tool plate 1003 to manway body/flange 2 as shown in FIG. 14.

FIG. 16 is a side view showing alignment tool 50 of the present invention attached to a manway body/flange 2 and to manway cover 1. As illustrated, fasteners 1011 (e.g., bolts) fasten tool plate 1003 to an outside surface 1026 of manway body/flange 2 with the tool beam support 1005 extending over and across manway body/flange 2 and manway cover 1. Tool beam support 1005 is positioned on body/flange alignment tool plate 1003 to be a predefined vertical distance D1 from a circumferential perimeter 28 of manway body/flange 2. Fasteners 1011b also secure cover attachment plate 1009 to an outside surface 30 of manway cover 1. In the example shown in FIG. 16, cover attachment plate 1009 is preferably a steel plate with an L-shape as discussed above. Height adjuster 1004 extends transversely through distal end 1005b of tool beam support 1005 at a predefined distance D2 from tool plate 1003 and through a support portion 1009a of cover attachment plate 1009. As a result, manway cover 1 is spaced from manway body/flange 2 by a predefined distance D3. Distance D3 is sufficient to allow alignment and insertion of the manway cover bolts through the manway cover and into and through the manway body/flange where the inserted cover bolts support the manway cover permitting the removal of cover alignment plate 1009 from the manway cover. A retaining fastener 1014 secures cover attachment plate 1009 to height adjuster 1004.

FIG. 17 is a side view of another embodiment of alignment tool device 50 of the present invention shown attached to manway body/flange 2 and cover 1. In the example of FIG. 17, tool plate 1003 is secured to an inside surface 32 of manway body/flange 2 using fasteners 1011. Tool beam support 1005 extends from body/flange alignment tool plate 1003 in a fashion similar to the embodiment shown in FIG. 16. In some embodiments where body/flange alignment tool plate 1003 is attached to inside surface 32, tool beam support 1005 has a reduced length to maintain a chosen value for predefined distance D3 between manway body/flange 2 and manway cover 1.

It is contemplated that tool beam support 1005 may include a slot 1005a for receiving height adjuster 1004 (shown in FIG. 19), which slot 1005a permits movement of height adjuster 1004 along a predefined axial length of tool beam support 1005. It is also contemplated that tool beam support 1005 may be tubular for supporting one or more rollers 1006 on an inside or outside track 5b, 5c, respectively, (shown in FIGS. 20 and 20) with height adjuster 1004 extending through a tubular roller shaft transversely connected to the one or more rollers 1006. The tubular tool beam support 1005 includes a height-adjusting surface for making contact with an adjusting nut 1016 to raise or lower height adjuster 1004 and therefore manway cover 1. The rollers 1006 provide horizontal/lateral movement of height adjuster 1004 and attached cover 1 along the longitudinal direction of tool beam support 1005 for moving manway cover 1 toward or away from manway body/flange 2. In another embodiment, tool beam support 1005 is an I-beam and supports a beam trolley/hoist 1100 as is known in the art. Beam trolley/hoist 1100 is then used to raise or lower cover attachment plate 1009 using height adjuster 1004, where height adjuster is a rod, chain, hook, or the like.

Figure 18:
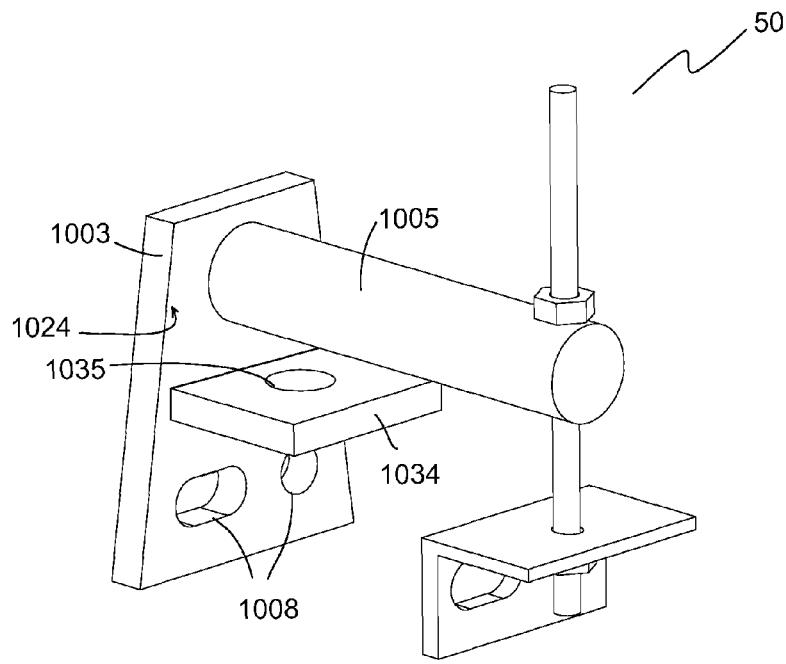
FIG. 18 is a front perspective view of another embodiment of the alignment tool of the present invention that includes a set-screw flange extending from the alignment tool plate.
Figure 19:
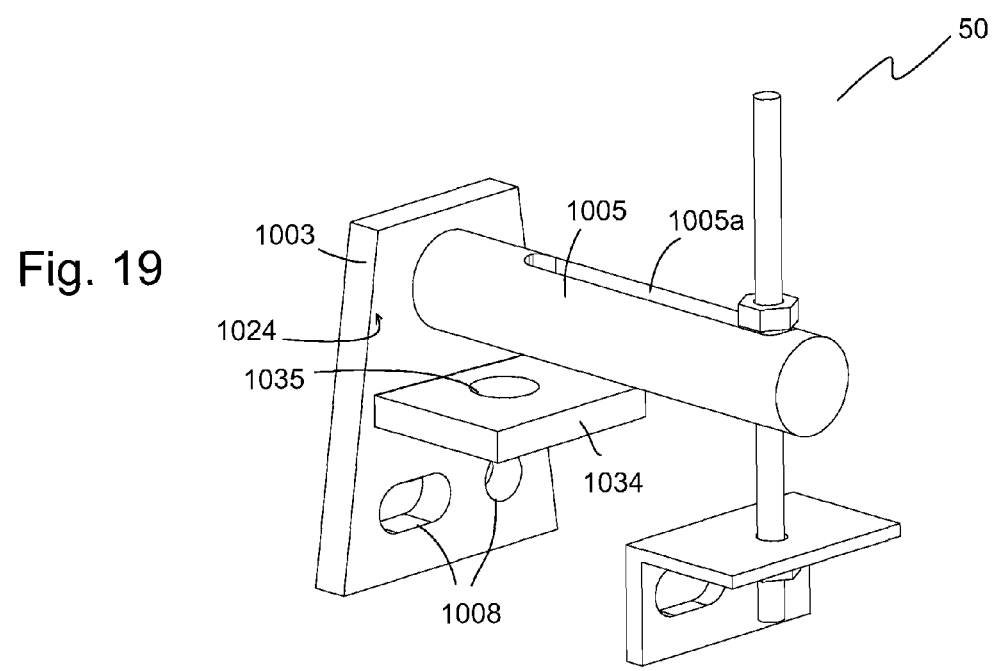
FIG. 19 is a front perspective view of another embodiment of the alignment tool showing a tool beam support with a slot for receiving the height adjuster.
Figure 20:
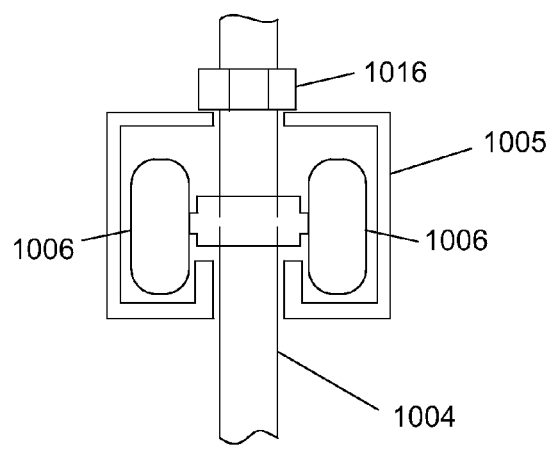
FIG. 20 is a cross-sectional view of another embodiment of the tool beam support of the present invention showing a tubular structure with a slot and rollers for movably supporting the height adjuster.
Figure 21:
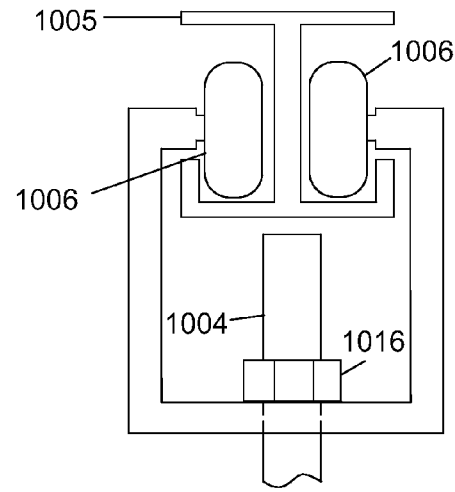
FIG. 21 is a cross-sectional view of another embodiment of the tool beam support showing an I-beam structure with rollers for movably supporting the height adjuster.

FIG. 18 is a front perspective view of another embodiment of alignment tool 50 for securing body/flange alignment tool plate 1003 to manway body/flange 2. In this embodiment, a set-screw flange 1034 extends transversely from first planar surface 1024 of body/flange alignment tool plate 1003. Set-screw flange 1034 is positioned between tool beam support 1005 and plate openings 1008. Set-screw flange 1034 has one or more set-screw opening 1035 (preferably threaded) that extends transversely therethrough. In one embodiment, set-screw flange 1034 is a steel plate or L-shaped angle bracket attached to first planar surface 1024 by (1) welding, (2) bolts extending through body/flange alignment tool plate 1003 and into set-screw flange 1034, or (3) other means. In another embodiment, set-screw flange 1034 has a plurality of set screw openings 1035 each of which is aligned with plate openings 1008.

Figure 22:
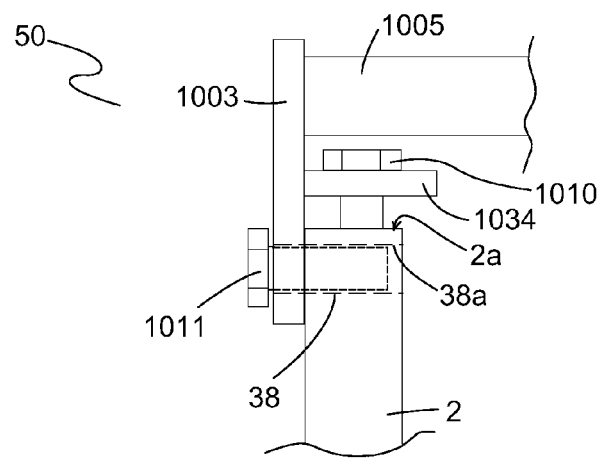
FIG. 22 is a side elevation view of the embodiment of FIG. 6 shown with a set screw for securing the body/flange alignment tool plate to the manway body/flange

Referring now to FIG. 22, a side view shows a portion of alignment tool 50 with set-screw flange 1034 and body/flange alignment tool plate 1003 attached to manway body/flange 2. Set-screw flange 1034 has a set-screw 1010 threadably connected through set-screw opening 1035. Set-screw 1010 extends through set-screw flange 1034 to contact a circumferential peripheral edge 2a of manway body/flange 2. A fastener 1011 extends through tool plate 3 and into a manway body/flange opening 1038. Upon turning set-screw 1010 against peripheral edge 2a of manway body/flange 2, fastener 1011 is forced against an inside surface 38a of manway body/flange opening 38 and "jams" fastener 1011 against inside surface 38a of manway body/flange opening 28 to effectively secure body/flange alignment tool plate 3 to manway body/flange 2.

Figure 23:
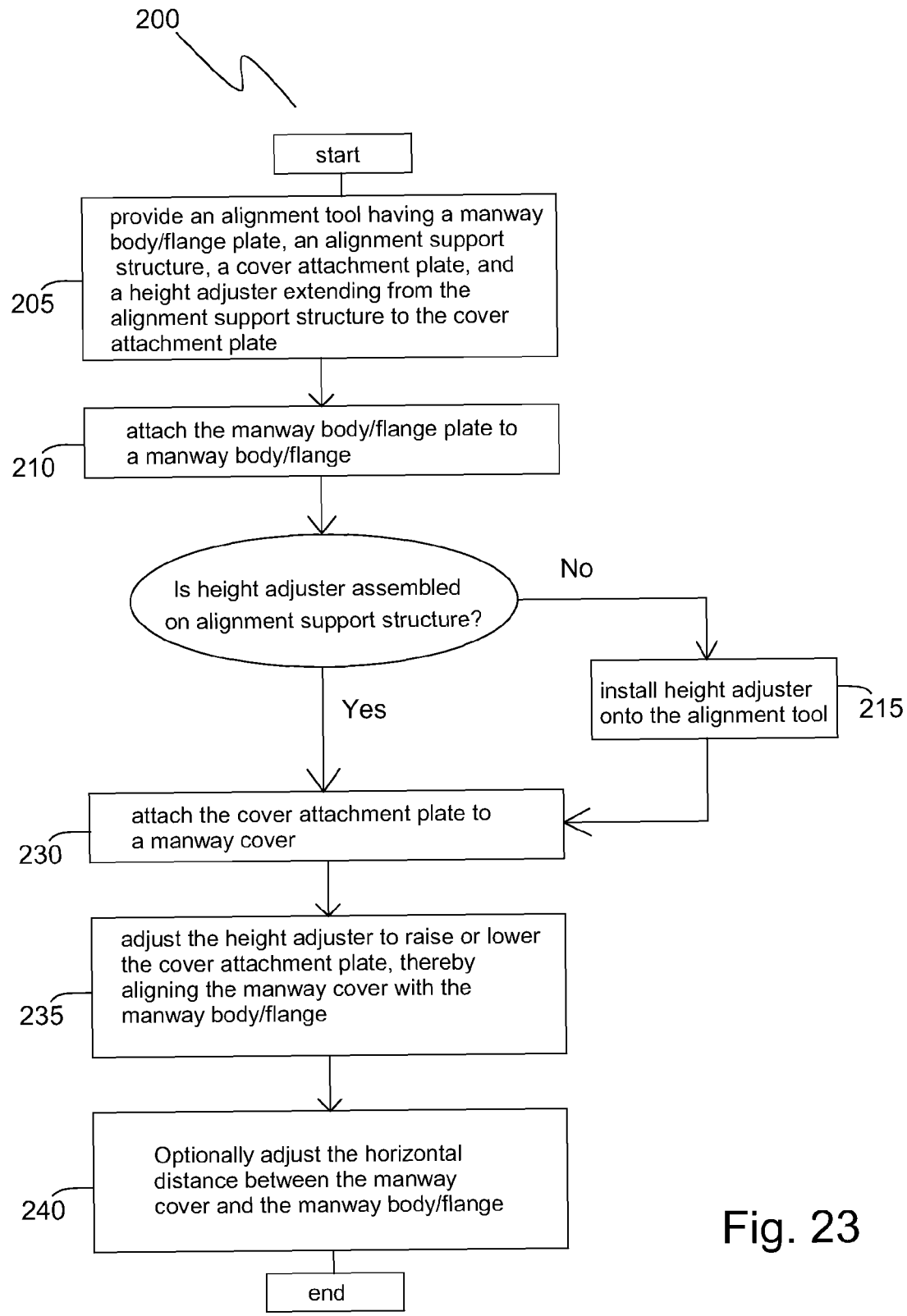
FIG. 23 is a flow chart illustrating steps in one embodiment of a method of aligning a manway cover with a manway body/flange of the present invention.

Referring now to FIG. 23, a flow chart illustrates steps in one method 1200 of aligning a manway cover 1 with a manway body/flange. In step 1205, the user provides an embodiment of alignment tool 50 that includes body/flange alignment tool plate 20, 1003, height adjuster 60, 1004, and cover alignment tool plate 40, 1009. In step 210, body/flange alignment tool plate 20, 1003 is secured to manway body/flange 2. Fasteners 1011 are positioned through plate openings 26, 1008 and into or through corresponding openings in manway body/flange. When alignment tool 50 is equipped with a set-screw flange 1034, set screw 1010 is optionally advanced against top circumferential edge 2a of manway body/flange 2 to jam fastener(s) 1011 against inside edge 38a of opening 38 in manway body/flange 2. Using set screw 1010 is especially effective when opening 38 is a smooth bore.

In optional step 215, height adjuster 60, 1004 is installed onto alignment tool 50. In one embodiment, height adjuster 60, 1004 is a threaded rod that is inserted or threaded into and through an opening 45, 56.

In some embodiments, the step of providing an adjustment tool 50 includes providing height adjuster 60, 1004 assembled on or to an alignment tool support 24, 1005. In such embodiments, step 215 is not performed.

In step 230, cover attachment plate 40, 1009 is attached to manway cover 1. Preferably, fasteners 1011 are positioned through cover plate openings 46, 1019 and into or through corresponding openings in manway cover 1.

In step 235, if needed, the height of the manway cover is adjusted to align openings in manway cover 1 with corresponding openings 38 in manway body/flange 2. In one embodiment, to raise or lower cover 1, adjustment nut 1016 or height adjuster 60 is rotated clockwise or counterclockwise, whatever is required, to align the openings in manway cover 1 with the corresponding openings in manway body/flange 2. In other embodiments, a handle or other attachment to height adjuster 60, 1004 is used to threadably advance height adjuster 60, 1004 up or down through opening 45, 1056.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An alignment tool for aligning a manway cover to a corresponding manway body/flange, the alignment tool comprising:
    a body/flange plate comprising:
        a flange plate body having a plurality of flange plate openings; and
        an alignment support structure selected from the group consisting of (1) a flange plate tongue fixedly attached to the flange plate body and extending perpendicularly from the flange plate body adjacent an outside flange body edge of the flange plate body and (2) a tool beam support fixedly attached to the flange plate body and extending a predefined distance transversely from the body/flange plate, the tool beam support having a distal end portion and an opening that extends transversely through the tool beam support;
    a cover plate comprising:
        a cover plate body having a plurality of cover plate openings; and
        when the alignment support structure is a flange plate tongue, a cover plate tongue is fixedly attached to the cover plate body and extends perpendicularly from the cover plate body adjacent an outside cover body edge of the cover plate body wherein the flange plate tongue and the cover plate tongue are oriented in a spaced, parallel and opposed orientation relative to each other wherein each of the flange plate tongue and the cover plate tongue overlap and extend towards and past each other wherein at least one of the flange plate tongue or the cover plate tongue has a threaded opening; and when the alignment tool structure is a tool beam support, the cover plate has a first plate portion and a second plate portion fixedly attached to the first plate portion wherein the first plate portion extends transversely from the second plate portion, wherein the first plate portion is adapted to be removably and directly connected to the height adjuster, wherein the tool beam support and the first plate portion are oriented in a spaced, parallel orientation relative to each other, and the tool beam support extends towards and past the second plate portion, and wherein the second plate portion includes the plurality of cover plate openings; and a threaded height adjuster extending through the alignment support structure wherein, when the alignment support structure is a flange plate tongue, the height adjuster is threadably disposed through the threaded opening and engages the cover plate tongue and the flange plate tongue where rotation of the height adjuster causes the cover plate tongue and the flange plate tongue to move closer or further away from each other, and when the alignment support structure is a tool beam support, the height adjuster directly connects to the first plate portion of the cover plate and extends through the opening of the tool beam support and connects the tool beam support to the cover plate where manipulation of the threaded height adjuster causes the cover plate to move closer or further away from the tool beam support;

wherein the height adjuster is orthogonal to the cover plate openings and the flange plate openings and adapted to change a position of the cover plate relative to the flange plate whereby manway cover openings are capable of being substantially aligned with corresponding manway flange openings.

2. The alignment tool of claim 1 wherein, when the flange plate body has a flange plate tongue, (1) the flange plate body has a lower plate portion co-planar with the flange plate body wherein the lower plate portion extends transversely from the outside flange body edge, the flange plate tongue being directly connected to the lower plate portion and (2) the cover plate body has an upper plate portion co-planar with the cover plate body wherein the upper plate portion extends transversely from the outside cover body edge, the cover plate tongue being directly connected to the upper plate portion whereby the flange plate tongue extends from the lower plate portion of the flange plate body and the cover plate tongue extends from the upper plate portion of the cover plate body.

3. The alignment tool of claim 2 wherein each of (1) the flange plate body and the lower plate portion and (2) the cover plate body and the upper plate portion define an L-shape when viewed from the outside flange plate edge and the outside cover plate edge, respectively.

4. The alignment tool of claim 1 wherein, when the flange plate body has a flange plate tongue, the one of a cover tongue opening, a flange tongue opening or both is threaded internally and the height adjuster is threaded externally for threadable engagement with the one of the cover tongue opening, the flange tongue opening or both.

5. The alignment tool of claim 1 further comprising, when the flange plate body has a flange plate tongue, a flange gusset directly connected between the lower plate portion and the flange plate tongue.

6. The alignment tool of claim 1 further comprising, when the cover plate body has a cover plate tongue, a cover gusset directly connected between upper plate portion and the cover plate tongue.

7. The alignment tool of claim 1 wherein the height adjuster threadably engages one of the cover tongue opening, the flange tongue opening or both.

8. The alignment tool of claim 1 wherein, when the flange plate body has a flange plate tongue, one of the cover tongue opening, the flange tongue opening or both is threaded internally and the height adjuster is a threaded fastener.

9. The alignment tool of claim 1 wherein, when the alignment tool structure is a tool beam support, the height adjuster is moveable along a predefined axial length of the tool beam support.

10. The alignment tool of claim 9 wherein the tool beam support includes one of a track on an outside surface of the tool beam support, a track on an inside surface of the tool beam support or a slot through the tool beam support.

11. The alignment tool of claim 9 wherein the height adjuster is moveably supported on the tool beam support by one or more rollers.

12. The alignment tool of claim 1 wherein at least one of the plurality of flange plate openings or cover plate openings is an elongated slot.

13. The alignment tool of claim 1, further comprising, when the alignment support structure is the tool beam support:
a set-screw flange extends transversely from the body/flange plate parallel to and adjacent the tool beam support, the set-screw flange having a set-screw opening extending through the set-screw flange and aligned with a peripheral edge of the manway body/flange; and
a set screw adapted to extend through and threadably engage the set-screw opening for contact with the peripheral edge of the manway body/flange.

14. A method of aligning a manway cover to a manway body/flange comprising:
providing an alignment tool comprising:
a body/flange plate having a flange plate body with a plurality of flange plate openings; and
an alignment support structure selected from the group consisting of (1) a flange plate tongue fixedly attached to the flange plate body and extending perpendicularly from the flange plate body adjacent an outside flange body edge of the flange plate body and (2) a tool beam support fixedly attached to the flange plate body and extending a predefined distance transversely from the body/flange plate, the tool beam support having a distal end portion and an opening that extends transversely through the tool beam support;
a cover plate comprising:
a cover plate having a cover plate body having a plurality of cover plate openings; and
when the alignment support structure is a flange plate tongue, a cover plate tongue is fixedly attached to the cover plate body and extends perpendicularly from the cover plate body adjacent an outside cover body edge of the cover plate body wherein the flange plate tongue and the cover plate tongue are oriented in a spaced, parallel and opposed orientation relative to each other wherein each of the flange plate tongue and the cover plate tongue overlap and extend towards and past each other wherein at least one of the flange plate tongue or the cover plate tongue has a threaded opening; and when the alignment tool structure is a tool beam support, the cover plate has a first plate portion and a second plate portion fixedly attached to the first plate portion wherein the first plate portion extends transversely from the second plate portion, wherein the first plate portion is adapted to be removably and directly connected to the height adjuster, wherein the tool beam support and the first plate portion are oriented in a spaced, parallel orientation relative to each other, and the tool beam support extends towards and past the second plate portion, and wherein the second plate portion includes the plurality of cover plate openings; and a threaded height adjuster extending through the alignment support structure wherein, when the alignment support structure is a flange plate tongue, the height adjuster is threadably disposed through the threaded opening and engages the cover plate tongue and the flange plate tongue where rotation of the height adjuster causes the cover plate tongue and the flange plate tongue to move closer or further away from each other, and when the alignment support structure is a tool beam support, the height adjuster directly connects to the first plate portion of the cover plate and extends through the opening of the tool beam support and connects the tool beam support to the cover plate where manipulation of the threaded height adjuster causes the cover plate to move closer or further away from the tool beam support wherein the height adjuster is orthogonal to the cover plate openings and the flange plate openings and adapted to change a position of the cover plate relative to the flange plate whereby manway cover openings are capable of being substantially aligned with corresponding manway flange openings;

attaching the body/flange plate to the manway body/flange by aligning the plurality of flange plate openings with corresponding manway flange openings and securing the body/flange plate to the manway body/flange using a fastener in each of the aligned corresponding flange plate openings and manway flange openings;

attaching the cover plate to the manway cover by aligning the plurality of cover plate openings with corresponding manway cover openings and securing the cover plate to the manway cover using a fastener in each of the aligned corresponding cover plate openings and manway cover openings; and adjusting the position of the height adjuster to raise or lower the cover attachment plate relative to the body/flange plate, thereby adjusting the vertical position of the manway cover and causing alignment of the openings in the manway cover with the openings in the manway body/flange.

* * * * *